United States Patent
Ishii et al.

(10) Patent No.: US 11,966,249 B2
(45) Date of Patent: Apr. 23, 2024

(54) VEHICLE PEDAL STRUCTURE

(71) Applicant: KUBOTA CORPORATION, Osaka (JP)

(72) Inventors: Shinsuke Ishii, Sakai (JP); Naoko Takahashi, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/009,352

(22) PCT Filed: Jun. 1, 2021

(86) PCT No.: PCT/JP2021/020880
§ 371 (c)(1),
(2) Date: Dec. 9, 2022

(87) PCT Pub. No.: WO2021/256249
PCT Pub. Date: Dec. 23, 2021

(65) Prior Publication Data
US 2023/0341884 A1 Oct. 26, 2023

(30) Foreign Application Priority Data
Jun. 19, 2020 (JP) .................................. 2020-106513

(51) Int. Cl.
*G05G 1/46* (2008.04)
*G05G 1/44* (2008.04)
(Continued)

(52) U.S. Cl.
CPC ................. *G05G 1/46* (2013.01); *G05G 1/44* (2013.01); *B60K 23/02* (2013.01); *B60K 26/02* (2013.01); *B60T 7/04* (2013.01)

(58) Field of Classification Search
None
See application file for complete search history.

(56) References Cited

U.S. PATENT DOCUMENTS 3,392,605 A * 7/1968 McLean ................ B60W 10/10
477/166
5,136,899 A * 8/1992 Hoch ..................... B60K 23/00
74/513

FOREIGN PATENT DOCUMENTS

| JP | 2014-229162 A | 12/2014 |
| JP | 2015-095245 A | 5/2015 |
| JP | 2017-117176 A | 6/2017 |

OTHER PUBLICATIONS

Official Communication issued in International Patent Application No. PCT/JP2021/020880, dated Jun. 29, 2021.

* cited by examiner

*Primary Examiner* — Vicky A Johnson
(74) *Attorney, Agent, or Firm* — Keating & Bennett, LLP

(57) ABSTRACT

A vehicle pedal structure includes an accelerator pedal swingable about a swing shaft inclined with respect to a width direction in a top view of a traveling vehicle, and a mechanical link to convert swinging of the accelerator pedal into sliding in a front-rear direction. The link includes a first link structure and a second link structure that include first and second swings and first and second rods. Each of a first end and a second end of the second rod is restricted from sliding along an entering-exiting direction. In the link structures, in the top view, a second angle of a second swing shaft with respect to the width direction is smaller than a first angle of a first swing shaft with respect to the width direction.

4 Claims, 9 Drawing Sheets

(51) Int. Cl.
*B60K 23/02* (2006.01)
*B60K 26/02* (2006.01)
*B60T 7/04* (2006.01)

VEHICLE PEDAL STRUCTURE

CROSS REFERENCE TO RELATED APPLICATIONS

This is a U.S. National Phase Application under 35 U.S.C. § 371 of International Patent Application No. PCT/JP2021/020880, filed Jun. 1, 2021, which claims priority of Japanese Patent Application No. 2020-106513, filed Jun. 19, 2020. The entire contents of which are hereby incorporated by reference.

BACKGROUND OF THE INVENTION

1. Field of the Invention

The present invention relates to a vehicle pedal structure that includes a pedal that swings about a swing shaft inclined with respect to a width direction of a traveling vehicle in a top view of the traveling vehicle.

2. Description of the Related Art

Japanese Patent Application Laid-Open No. 2015-95245 discloses a vehicle pedal structure that includes an accelerator pedal and a mechanical link mechanism that converts the swinging of the accelerator pedal into sliding in a front-rear direction of a traveling vehicle. As illustrated in FIG. 4 of Japanese Patent Application Laid-Open No. 2015-95245, when the accelerator pedal is disposed such that the toes of the operator are obliquely oriented in the front-rear direction in a top view of the traveling vehicle, the operator is able to place their foot on the accelerator pedal in a comfortable posture with the legs apart.

SUMMARY OF THE INVENTION

In the vehicle pedal structure of Japanese Patent Application Laid-Open No. 2015-95245, the accelerator pedal swings about a swing shaft along a width direction of the traveling vehicle in a top view of the traveling vehicle. As a result, when the operator steps on the accelerator pedal, the accelerator pedal moves only in the front-rear direction without moving in the width direction in a top view. Therefore, in a state where the toes of the operator are oriented obliquely, the accelerator pedal is stepped on while being laterally displaced with respect to the foot of the operator. Consequently, the operator may have to adjust the position of the foot while stepping on the accelerator pedal.

In order to improve the operability of the accelerator pedal, it is assumed that the accelerator pedal is swung by a swing shaft inclined with respect to the width direction in a top view. In the vehicle pedal structure of Japanese Patent Application Laid-Open No. 2015-95245, because a wire is used as one of the link members constituting the link mechanism, only the displacement in the front-rear direction can be transmitted by the wire having a high degree of freedom of arrangement. As a result, even if the swing displacement of the accelerator pedal has a width-direction component, the swinging of the accelerator pedal can be converted into sliding in the front-rear direction of the traveling vehicle.

However, because the rigidity of the wire is generally lower than that of a rigid member such as a rod, there has been a problem that a time lag is likely to occur from the moment the accelerator pedal is operated until the interlocking of the wire, and the operability is likely to deteriorate. In addition, when a foreign substance (for example, sand, stone, and the like) enters between the wire and the tubular member covering the wire, there is the problem that the wire does not move smoothly and operability of the accelerator pedal deteriorates. Furthermore, such deterioration in the operability of the pedal is not limited to the accelerator pedal, and may occur in other pedals (for example, a brake pedal or the like) having a similar structure.

Preferred embodiments of the present invention provide vehicle pedal structures that each includes a pedal that swings about a swing shaft inclined with respect to a width direction of a traveling vehicle in a top view of the traveling vehicle so that operability of the pedal is improved.

A vehicle pedal structure according to an aspect of a preferred embodiment of the present invention is a vehicle pedal structure including a pedal swingable about a swing shaft inclined with respect to a width direction of a traveling vehicle in a top view of the traveling vehicle. The vehicle pedal structure includes a mechanical link to convert swinging of the pedal into sliding in a front-rear direction of the traveling vehicle. The mechanical link includes a plurality of link structures that include a pair of swings and a rod connected to the pair of swings. The pair of swings include a first swing to swing about a first swing shaft in accordance with the swinging of the pedal, and a second swing to swing about a second swing shaft in accordance with the swinging of the first swing, the swinging being transmitted via the rod. The rod includes a first end inserted into an opening in the first swing and a second end inserted into an opening provided in the second swing. Each of the first end and the second end of at least one of the rods is restricted from sliding along an entering-exiting direction in which the first end and the second end are each inserted into the openings and removed from the openings. In the plurality of link structures, in the top view, a second angle of the second swing shaft with respect to the width direction is smaller than a first angle of the first swing shaft with respect to the width direction.

By making the second angle smaller than the first angle, the displacement of the link in the width direction can be reduced every time the displacement of the link is transmitted by each link structure, and the swinging of the pedal can be converted into the sliding in the front-rear direction of the traveling vehicle.

Further, stress corresponding to the displacement in the width direction to be reduced is applied to the rod connected to the pair of swings. By reducing displacement in the width direction by the plurality of link structures, stress is dispersed in the plurality of rods. A load applied to one rod can be reduced, and deterioration of the operability of the pedal due to deformation of the rod can be reduced or prevented. Even when stress corresponding to the displacement in the width direction is applied to the rod, the sliding of the rod is restricted by bilateral fixing portions. As a result, because the restricted rod does not slide irregularly with respect to the swing, it is possible to reduce or prevent deterioration in the operability of the pedal due to sliding of the rod.

In a preferred aspect of a preferred embodiment of the present invention, the link structure includes a first link structure and a second link structure to which the swinging of the pedal is transmitted via the first link structure. The first link structure is a link structure closer to the pedal than the second link structure. At least in the second link structure, each of the first end and the second end is restricted from sliding along the entering-exiting direction. A difference between the first angle and the second angle in the first link structure is smaller than a difference between the first angle and the second angle in the second link structure. In the first link structure close to the pedal, reduction in displacement in the width direction is reduced, and in the second link structure spaced apart from the pedal, reduction in displacement in the width direction is increased. Thus, the swinging of the pedal can be converted into sliding in the front-rear direction of the traveling vehicle without reducing operability.

In a preferred aspect of a preferred embodiment of the present invention, the length of the rod of the second link structure can be longer than the length of the rod of the first link structure.

In the second link structure, in order to increase the reduction in displacement in the width direction, the stress applied to the rod of the second link structure is larger than the stress applied to the rod of the first link structure. By increasing the length of the rod of the second link structure to which a large stress is applied, the strain applied per unit length due to the stress can be reduced, and deterioration of the operability of the pedal due to the deformation of the rod can be reduced or prevented.

In a preferred aspect of a preferred embodiment of the present invention, the vehicle pedal structure can further include a fixing pin to fix the first end, an insertion hole, into which the fixing pin is inserted, in the first end, and a protrusion that protrudes from the first end in a direction orthogonal to the entering-exiting direction. In the entering-exiting direction, the first swing can be between the fixing pin and the protrusion, so that sliding of the first end is restricted. The fixing pin can be inserted into the insertion hole such that the rod is removable from the first swing. By removing a fixing pin from the insertion hole, the rod can be removed from the first swing, thus enabling maintainability to be improved. In addition, because the sliding of the first end is restricted by a protrusion, the sliding of the first end can be easily restricted in comparison with a case where the sliding of the first end is restricted by two fixing pins by inserting the two fixing pins. As a result, the rod can be easily attached to the first swing, and maintainability can be improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
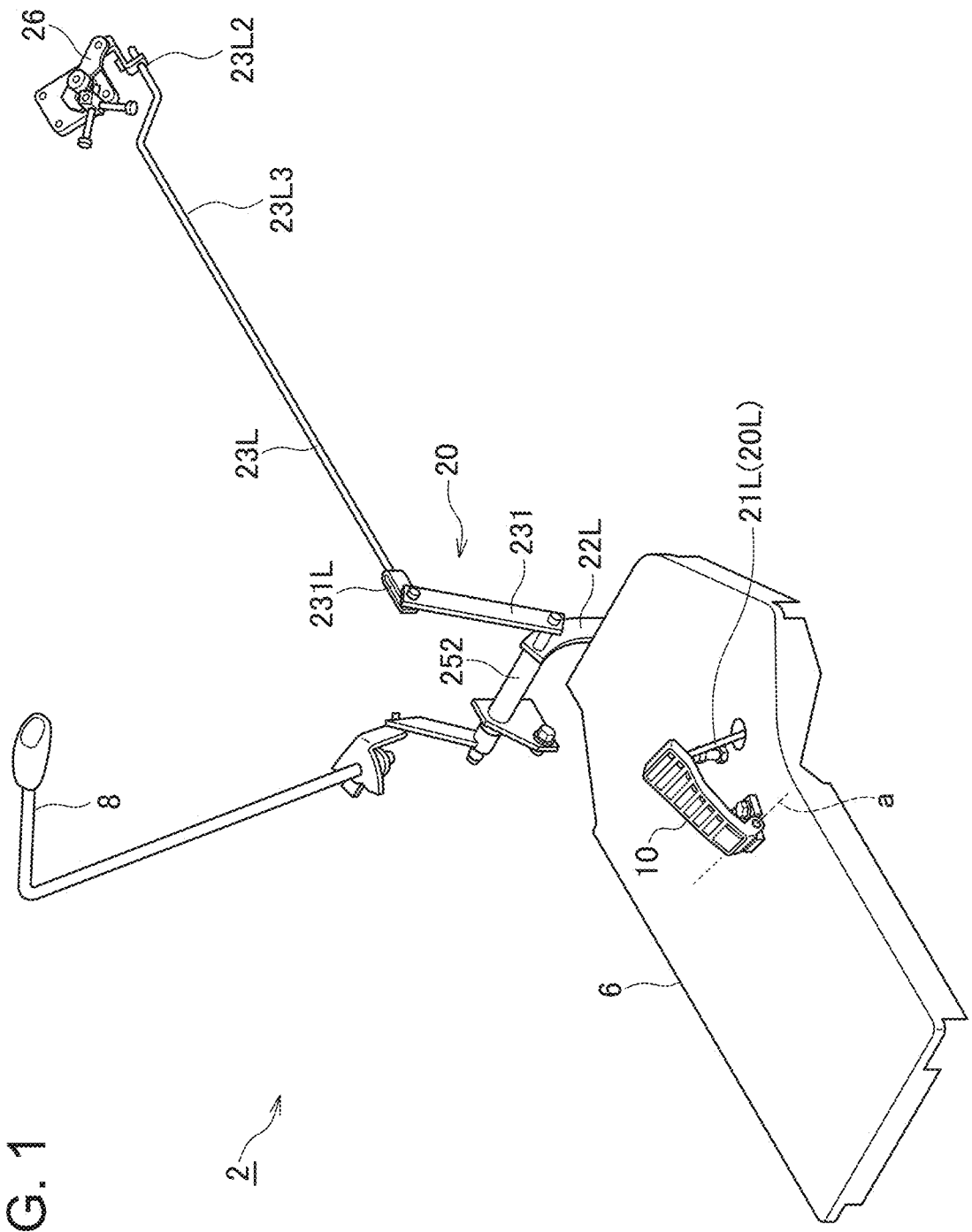
FIG. 1 is a perspective view of a vehicle pedal structure according to a preferred embodiment of the present invention.
Figure 2:
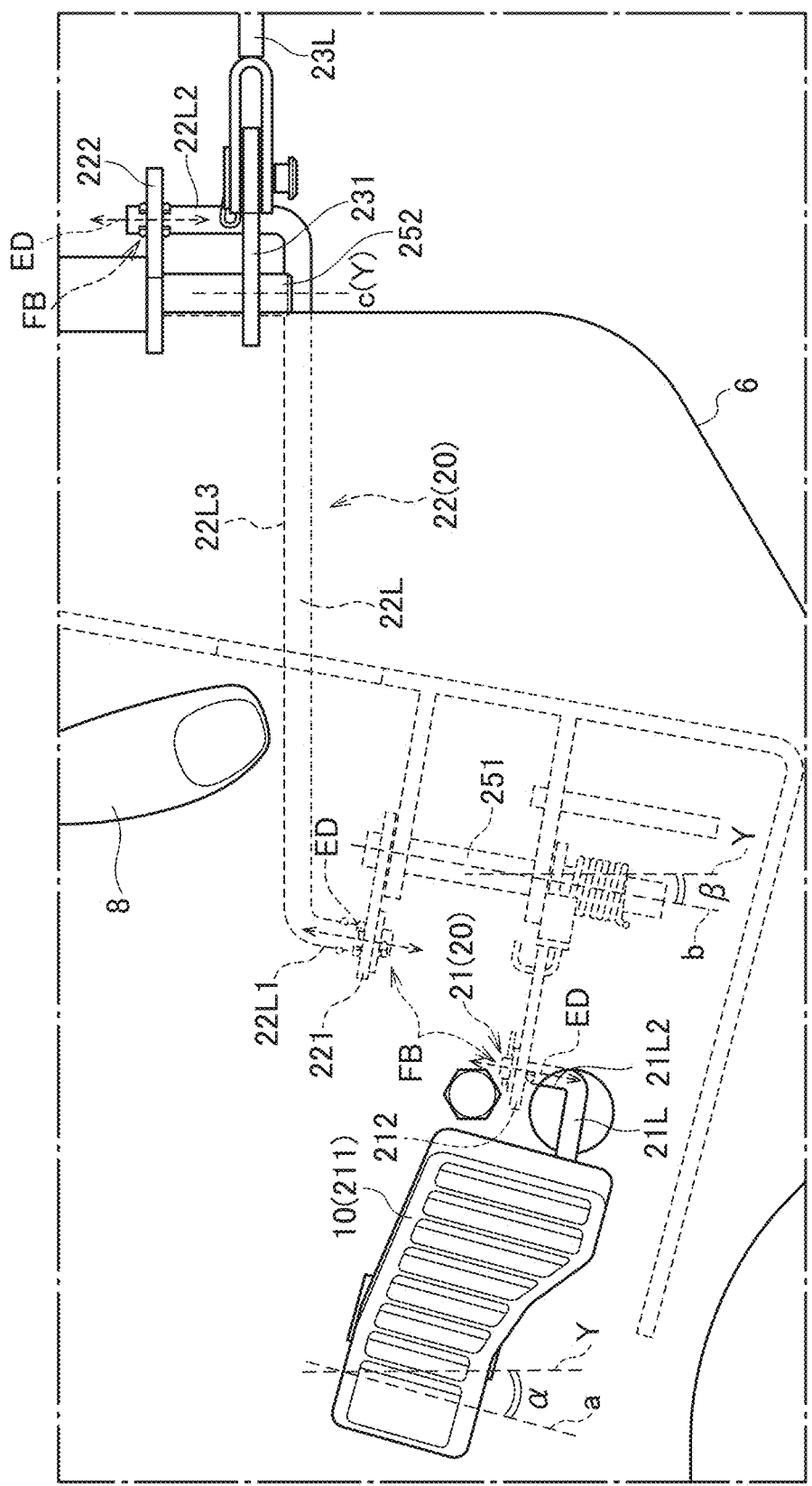
FIG. 2 is a top view of a vehicle pedal structure according to a preferred embodiment of the present invention.
Figure 3:
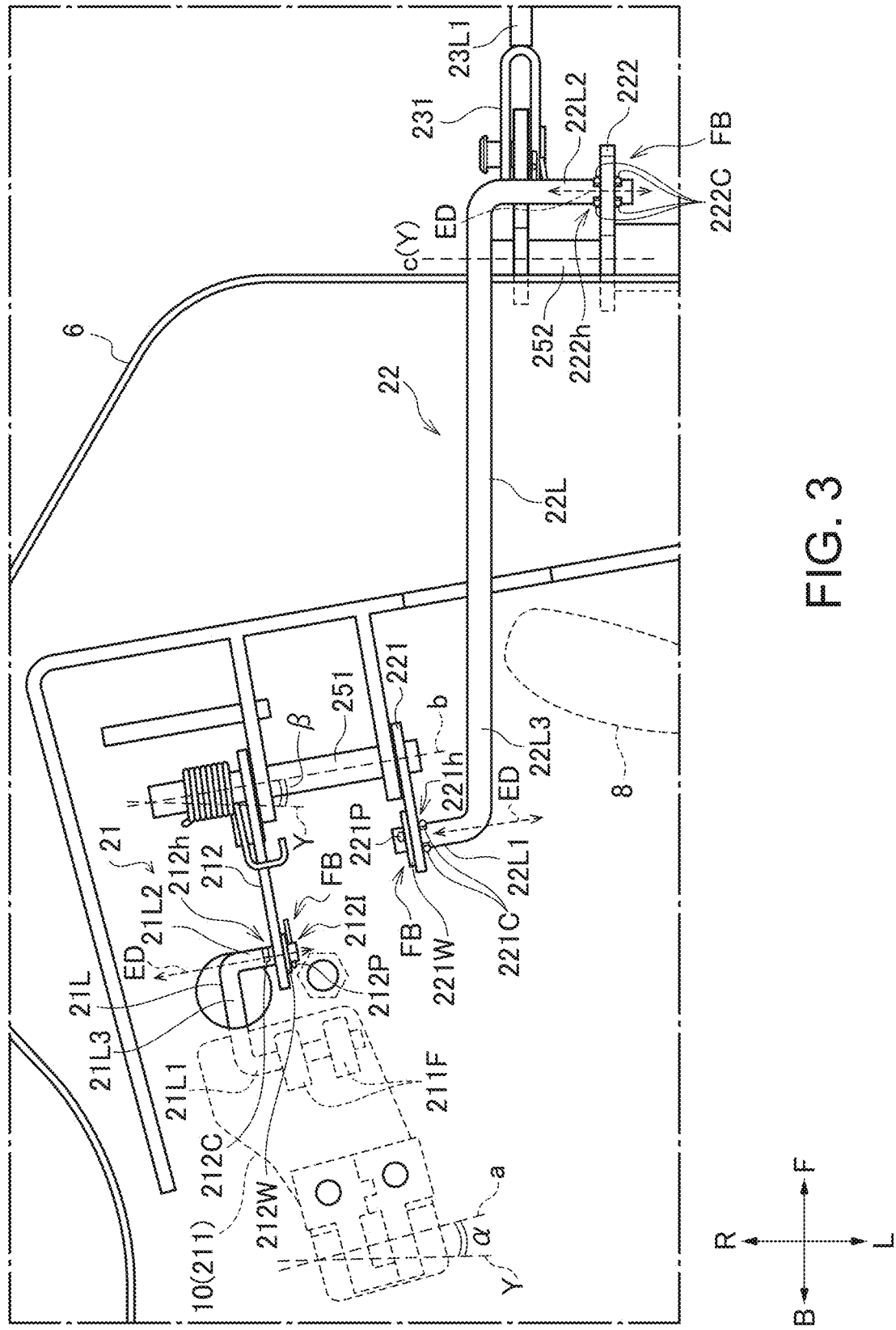
FIG. 3 is a bottom view of a vehicle pedal structure according to a preferred embodiment of the present invention.
Figure 4:
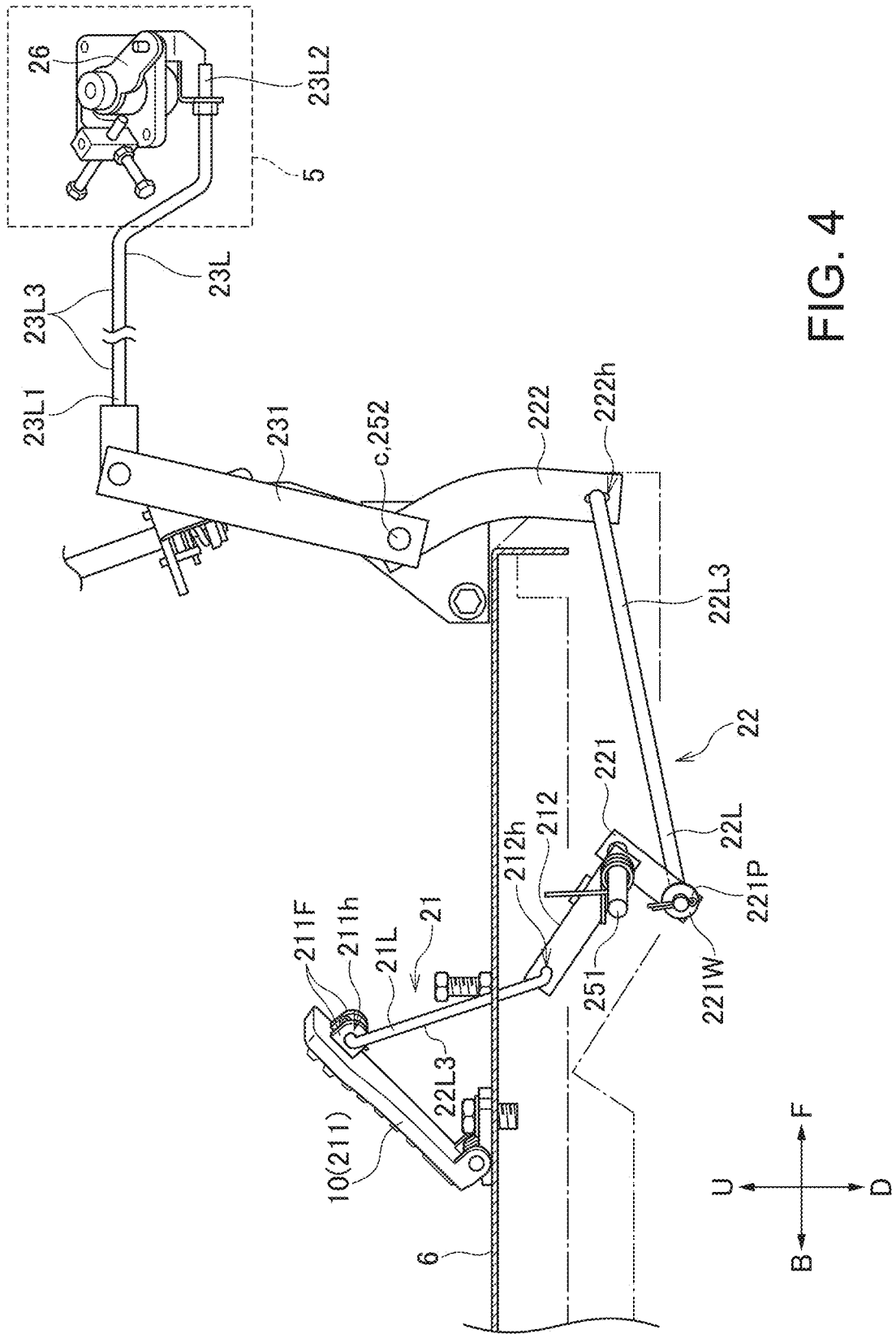
FIG. 4 is a right side view of a vehicle pedal structure according to a preferred embodiment of the present invention.
Figure 5:
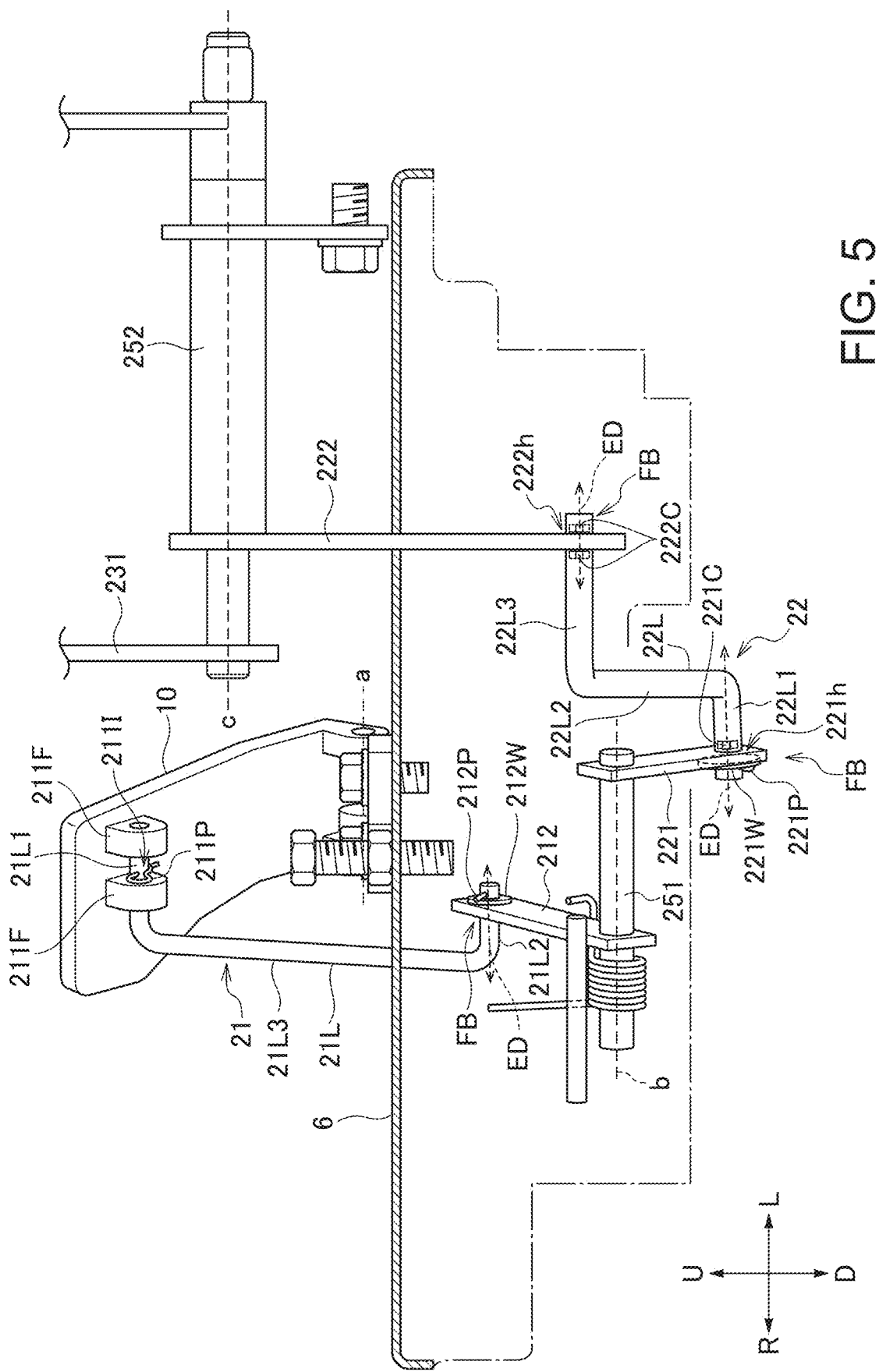
FIG. 5 is a front view of a vehicle pedal structure according to a preferred embodiment of the present invention.

Preferred embodiments of the present invention will be described in detail with reference to the accompanying drawings. In the following drawings, the same or similar reference numerals denote the same or similar portions. However, it should be noted that the drawings are schematic, and the proportions of each dimension are different from the actual figures. Therefore, specific dimensions should be determined in consideration of the following explanation. Further, the drawings may include portions having different dimensional relationships and ratios between the drawings. In the present specification and drawings, elements having substantially the same functions and structures are denoted by the same reference numerals, and redundant description thereof is omitted, and elements not directly related to the present invention are omitted from the drawings.

A vehicle pedal structure 2 will be described with reference to FIGS. 1 to 6. In the following description, directions indicated by arrows X, Y, and Z in the drawings are defined as a front-rear direction of the traveling vehicle, a width direction of the traveling vehicle, and a height direction of the traveling vehicle, respectively. In addition, in the description, directions indicated by an arrow U, an arrow D, an arrow F, an arrow B, an arrow L, and an arrow R in the drawing are defined as an upward direction, a downward direction, a forward direction, a backward direction, a leftward direction, and a rightward direction, respectively.

The vehicle pedal structure 2 is provided to a traveling vehicle. The traveling vehicle is, for example, a tractor. The vehicle pedal structure 2 is operable to regulate the engine speed of an engine 5 of the traveling vehicle. The vehicle pedal structure 2 includes an accelerator pedal 10 and a mechanical link mechanism 20. In the present preferred embodiment, the accelerator pedal 10 will be described as an example of a pedal that reduces or prevents deterioration in the operability.

The accelerator pedal 10 is an organ-type pedal. The accelerator pedal 10 swings about a swing shaft a that is inclined with respect to a width direction Y of the traveling vehicle in a top view of the traveling vehicle. An angle α of the swing shaft a with respect to the width direction Y is larger than 0 degree. In the present preferred embodiment, the angle α is about 15 degrees, for example. The accelerator pedal 10 is disposed above a floor portion 6 of a driving operation unit in which the operator rides.

The link mechanism 20 converts the swinging of the accelerator pedal 10 into sliding in the front-rear direction X of the traveling vehicle. The link mechanism 20 includes a plurality of link structures each including a pair of swing members and a rod connected to the pair of swing members. In the present preferred embodiment, the link mechanism 20 includes a first link structure 21 and a second link structure 22 as a plurality of link structures. Wire is not used for the link mechanism 20. For the link mechanism 20, plate-shaped and rod-shaped members that are less likely to be deformed than wires are used. The link mechanism 20 is also provided with bilateral fixing portions FB. The bilateral fixing portions FB restrict sliding of each of one end and another end of the at least one rod along an entering-exiting direction ED in which the rod is inserted into an opening provided in the swing member and is removed from the opening. The restriction of the sliding may be implemented as long as the end of the rod does not slide substantially in the entering-exiting direction ED. Specifically, the end of the rod is restricted from sliding by about 3 mm or more along the entering-exiting direction ED, for example.

The first link structure 21 is closer to the accelerator pedal 10 than the second link structure 22. The second link structure 22 transmits the swinging of the accelerator pedal 10 via the first link structure 21. The pair of swing members includes a first swing member and a second swing member. In the present preferred embodiment, the link mechanism 20 includes first swing members 211 and 221, and second swing members 212 and 222.

The first link structure 21 includes a first swing member 211, a second swing member 212, and a first rod 21L. The first rod 21L is connected to the first swing member 211 and the second swing member 212. The first rod 21L extends from above the floor portion 6 to below same. The first rod 21L passes through a through-hole penetrating the floor portion 6. The first swing member 211 is the accelerator pedal 10. The first swing member 211 swings about the swing shaft a in accordance with the swinging of the accelerator pedal 10. The first swing member 211 is provided with an opening 211h into which the first rod 21L is inserted. Specifically, the first swing member 211 has an attachment portion 211F protruding downward, and the attachment portion 211F is provided with an opening 211h. The second swing member 212 swings about a swing shaft b in accordance with the swinging of the first swing member 211, which is transmitted via the first rod 21L. An angle β of the swing shaft b with respect to the width direction Y is greater than 0 degree. In the present preferred embodiment, the angle β is about 10 degrees, for example. The second swing member 212 is fixed to a first spindle 251. The second swing member 212 is provided with an opening 212h into which the first rod 21L is inserted.

The first rod 21L includes a first end 21L1, a second end 21L2, and a main body portion 21L3. The first end 21L1 is one end inserted into an opening 211h provided in the first swing member 211. The second end 21L2 is another end to be inserted into the opening 212h provided in the second swing member 212. The main body portion 21L3 is a portion connecting the first end 21L1 and the second end 21L2. The first end 21L1 is located above the floor portion 6, and the second end 21L2 is located below the floor portion 6.

An insertion hole 2111 into which the fixing pin 211P is inserted is provided in the first end 21L1. In the fixing pin 211P, the first rod 21L is removably inserted into the insertion hole 2111 from the attachment portion 211F (the first swing member 211/the accelerator pedal 10). Because the fixing pin 211P catches on the attachment portion 211F, the first rod 21L (the first end 21L1) is not removed from the attachment portion 211F. Meanwhile, by taking out the fixing pin 211P from the insertion hole 2111, the fixing pin 211P does not catch on the attachment portion 211F, and the first end 21L1 becomes movable in the right direction L and can be removed from the attachment portion 211F. Note that, while attached to the attachment portion 211F, the first end 21L1 may be slidable along the direction in which the first end 21L1 is inserted into the opening 211h and removed from the opening 211h.

The second end 21L2 is restricted from sliding along the entering-exiting direction ED by the bilateral fixing portions FB. For the second end 21L2, the bilateral fixing portions FB include a fixing pin 212P that fixes the second end 21L2, an insertion hole 2121 into which the fixing pin 212P is inserted in the second end 21L2, a protrusion 212C that protrudes from the second end 21L2 in a direction orthogonal to the entering-exiting direction ED, and a washer 212W disposed between the second swing member 212 and the fixing pin 212P. The protrusion 212C may be formed by crushing a portion of the second end 21L2. In the entering-exiting direction ED, the second swing member 212 is disposed between the fixing pin 212P and the protrusion 212C to restrict the second end 21L2 from sliding. In the fixing pin 212P, the first rod 21L is removably inserted into the insertion hole 2121 from the second swing member 212.

Figure 6B:
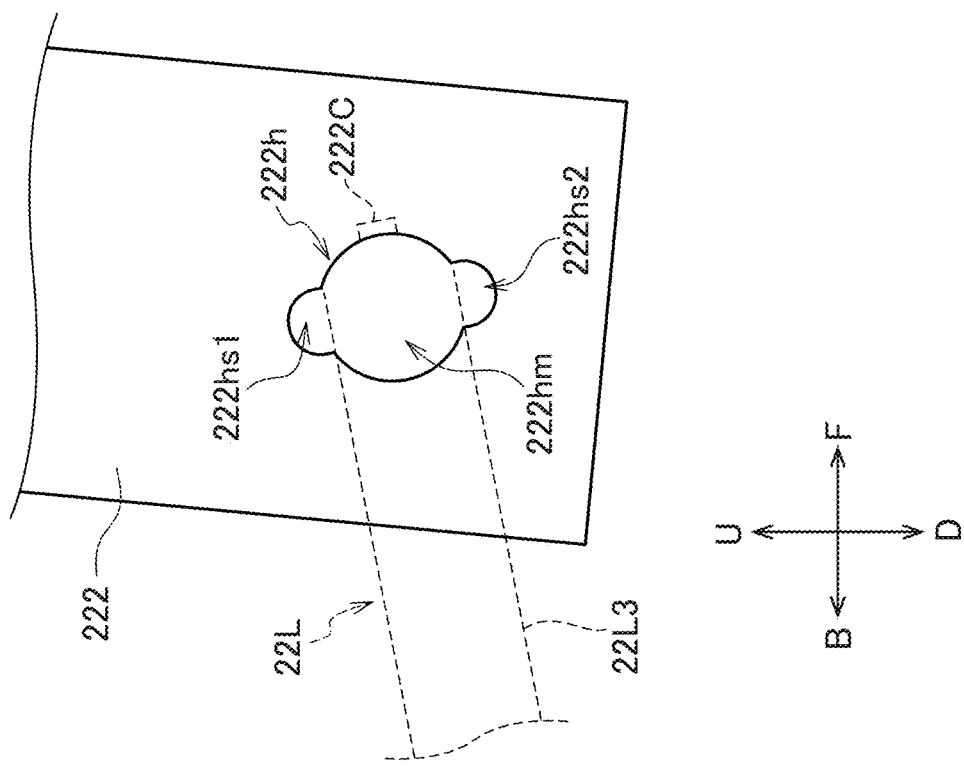
FIG. 6B is an enlarged right side view of a section of a second swing member of a second link structure.

The second link structure 22 includes a first swing member 221, a second swing member 222, and a second rod 22L. The second rod 22L is connected to the first swing member 221 and the second swing member 222. The first swing member 221 swings about the swing shaft b in accordance with the swinging of the accelerator pedal 10. Specifically, the first swing member 221 is fixed to the first spindle 251, and swings about the swing shaft b in accordance with the swinging of the second swing member 212. The first swing member 221 is provided with an opening 221h into which the second rod 22L is inserted. The second swing member 222 swings about a swing shaft c in accordance with the swinging of the second swing member 212, which is transmitted via the second rod 22L. In the present preferred embodiment, the angle (hereinafter, the angle γ) of the swing shaft c with respect to the width direction Y is 0 degree. The second swing member 222 is fixed to a second spindle 252 extending in the width direction Y. The second swing member 222 is provided with an opening 222h into which the second rod 22L is inserted. As illustrated in FIG. 6B, the opening 222h may have a main opening 222h1, a first sub-opening 222h2, and a second sub-opening 222h3. The main opening 222hm is a portion where the second rod 22L exists when the second rod 22L is inserted. The first sub-opening 222hs1 is a portion located above the main opening 222hm. The width of the first sub-opening 222hs1 in the front-rear direction X may be narrower than the width of the main opening 222hm in the front-rear direction X. The second sub-opening 222hs2 is a portion located below the main opening 222hm. The width of the second sub-opening 222hs2 in the front-rear direction X may be narrower than the width of the main opening 222hm in the front-rear direction X.

The second rod 22L includes a first end 22L1, a second end 22L2, and a main body portion 22L3. The first end 22L1 is one end inserted into the opening 221h provided in the first swing member 221. The second end 22L2 is another end to be inserted into the opening 222h provided in the second swing member 222. The first end 22L1 may be disposed below the second end 22L2 in the vertical direction Z. The main body portion 21L3 is a portion connecting the first end 22L1 and the second end 22L2. The length of the second rod 22L may be longer than the length of the first rod 21L.

Figure 6A:
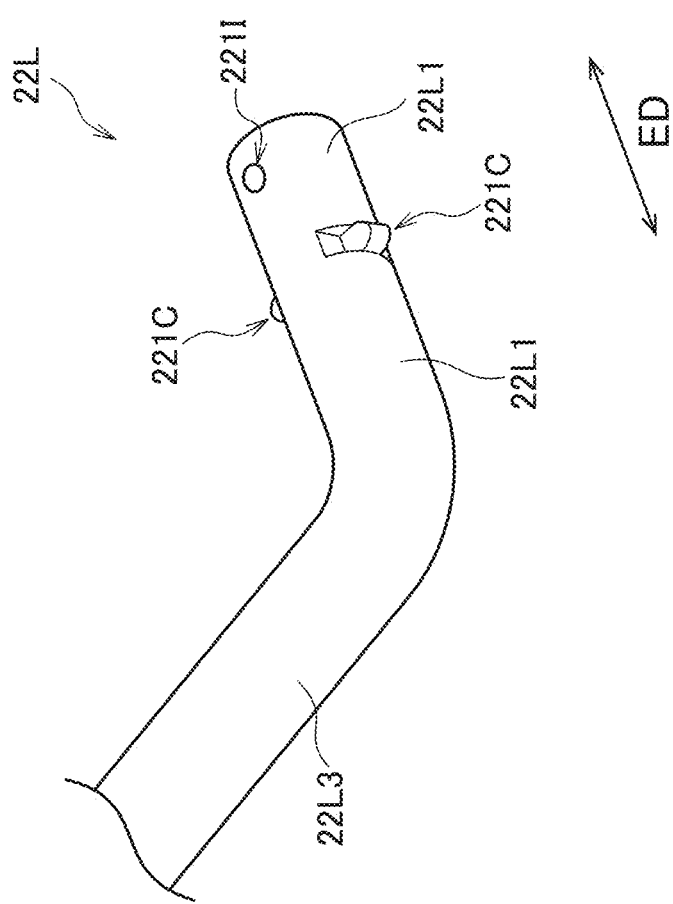
FIG. 6A is a perspective view of an end of a second rod.

The first end 22L1 is restricted by the bilateral fixing portions FB from sliding along the entering-exiting direction ED in which the first end is inserted into the opening 221h and removed from the opening 221h. For the first end 22L1, the bilateral fixing portions FB include a fixing pin 221P that fixes the first end 22L1, an insertion hole 2211 into which the fixing pin 221P is inserted in the first end 22L1, a protrusion 221C that protrudes from the first end 22L1 in a direction orthogonal to the entering-exiting direction ED, and a washer 221W disposed between the first swing member 221 and the fixing pin 221P. As illustrated in FIG. 6A, the protrusion 221C may be formed by crushing a portion of the first end 22L1. The protrusion 221C may be provided on both sides of the first end 22L1 in a direction orthogonal to the entering-exiting direction ED. As a result, sliding of the first end 22L1 may be further restricted. In the entering-exiting direction ED, the first swing member 221 is disposed between the fixing pin 221P and the protrusion 221C to restrict the first end 22L1 from sliding. The fixing pin 221P is inserted into the insertion hole 2211 such that the second rod 22L is removable from the first swing member 221.

Further, the second end 22L2 is restricted by the bilateral fixing portions FB from sliding along the entering-exiting direction ED in which the second end 22L2 is inserted into the opening 222h and removed from the opening 222h. For the second end 22L2, the bilateral fixing portions FB may have a protrusion 222C that protrudes in a direction orthogonal to the entering-exiting direction ED. The protrusion 222C may be disposed so as to sandwich the second swing member 222 in the entering-exiting direction ED. As a result, sliding of the second end 22L2 is thus restricted. The protrusion 221C may be provided on both sides of the second end 22L2 in a direction orthogonal to the entering-exiting direction ED. Consequently, sliding of the second end 22L2 may be further restricted.

The vehicle pedal structure 2 includes a third swing member 231 and a third rod 23L. The third swing member 231 is fixed to the second spindle 252. The third swing member 231 swings about the swing shaft c in accordance with the swinging of the accelerator pedal 10. Specifically, the third swing member 231 is fixed to the second spindle 252, and swings about the swing shaft c in accordance with the swinging of the second swing member 222. Note that the second swing member 222 may be manually swingable by a lever 8.

The third rod 23L includes a first end 23L1, a second end 23L2, and a main body portion 23L3. The first end 23L1 is one end connected to the third swing member 231. The second end 23L2 is an end on the engine 5 side, and is connected to a speed-regulating lever 26 that increases or decreases the engine speed of the engine 5. The main body portion 23L3 is a portion connecting the first end 23L1 and the second end 23L2. The third rod 23L extends in the front-rear direction X.

Figure 7:
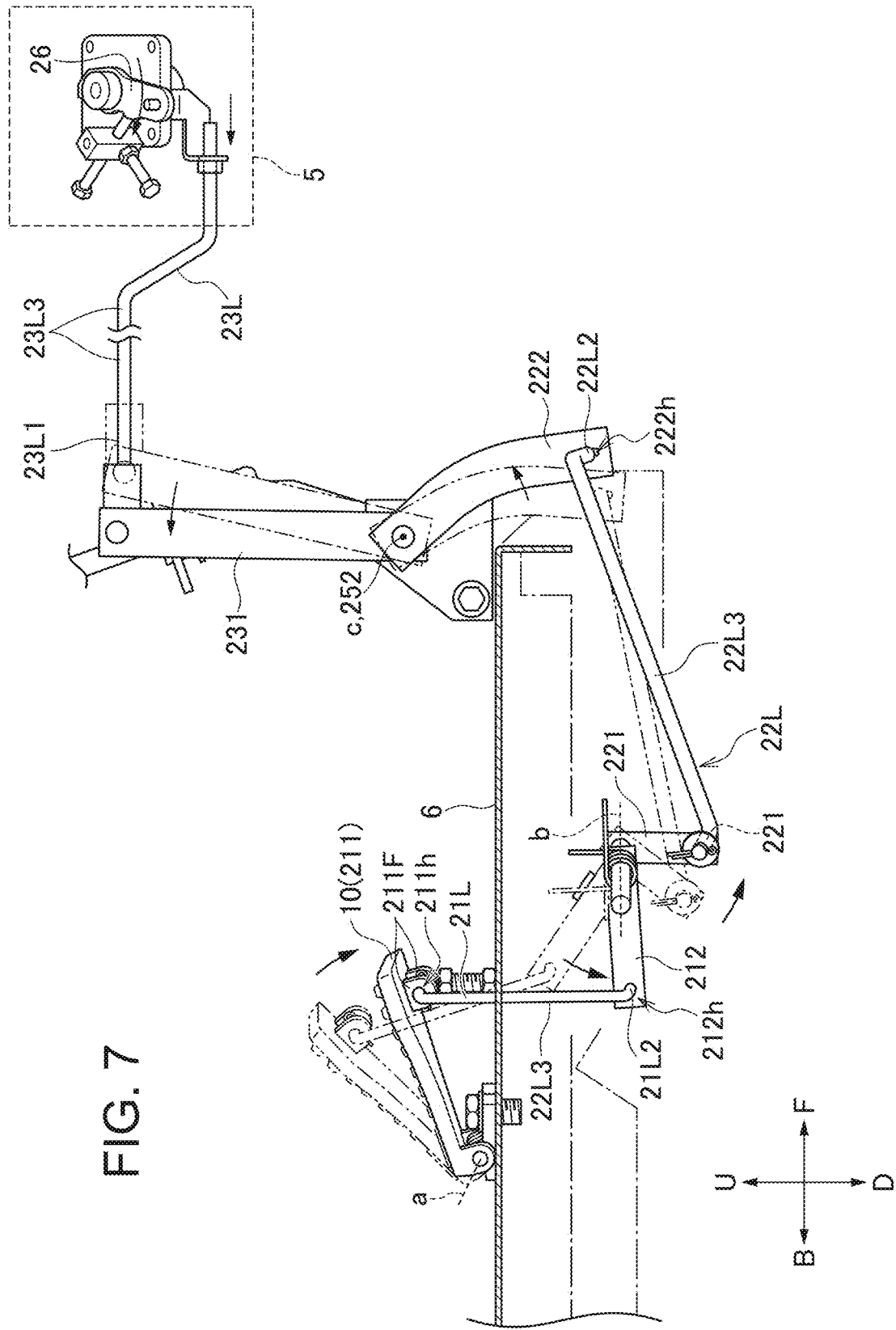
FIG. 7 is a diagram illustrating an operation example of a vehicle pedal structure according to a preferred embodiment of the present invention.
Figure 8:
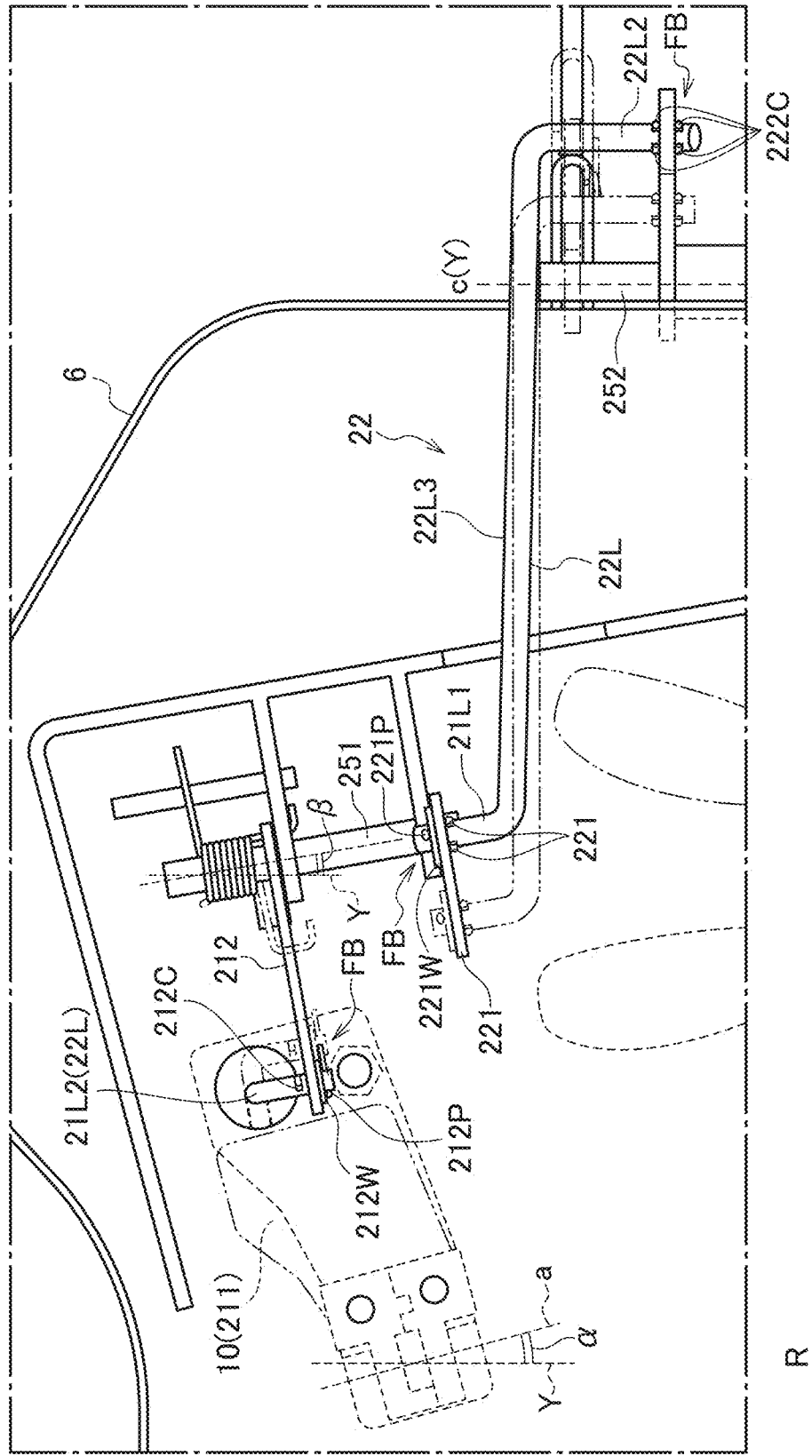
FIG. 8 is a diagram illustrating an operation example of a vehicle pedal structure according to a preferred embodiment of the present invention.
Figure 9:
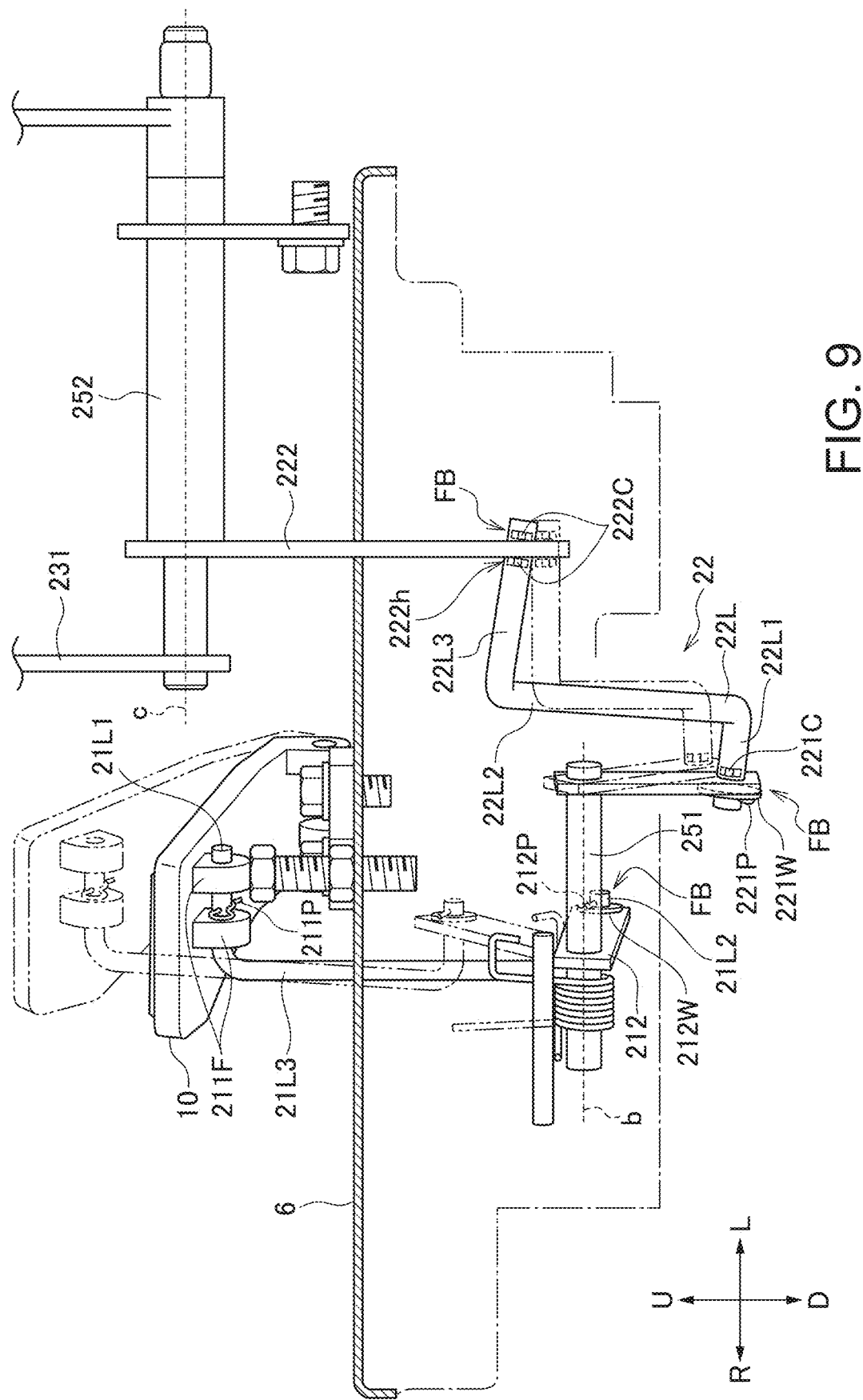
FIG. 9 is a diagram illustrating an operation example of a vehicle pedal structure according to a preferred embodiment of the present invention.

Next, the operation of the vehicle pedal structure will be described using FIGS. 1 to 9. As illustrated in FIGS. 7 to 9, when the operator steps on the accelerator pedal, the first swing member 211 (the accelerator pedal 10) swings downward about the swing shaft a. As a result, the first rod 21L moves downward, and the second swing member 212 swings downward. Due to the swinging of the second swing member 212, the first spindle 251 rotates, and the first swing member 221 swings downward and forward about the swing shaft b. Consequently, the second rod 22L moves forward, and the second swing member 222 swings forward. Due to the swinging of the second swing member 222, the second spindle 252 rotates, and the third swing member 231 swings rearward about the swing shaft c. As a result, the third rod 23L slides backward, and the speed-regulating lever 26 swings in a direction in which the engine 5 increases.

However, when the operator stops stepping on the accelerator pedal 10, the first swing member 211 (the accelerator pedal 10) swings upward about the swing shaft a. As a result, the first rod 21L moves upward, and the second swing member 212 swings upward. Due to the swinging of the second swing member 212, the first spindle 251 rotates, and the first swing member 221 swings upward and backward about the swing shaft b. As a result, the second rod 22L moves backward, and the second swing member 222 swings backward. Due to the swinging of the second swing member 222, the second spindle 252 rotates, and the third swing member 231 swings forward about the swing shaft c. Consequently, the third rod 23L slides forward, and the speed-regulating lever 26 swings in a direction in which the engine 5 increases.

As described above, the vehicle pedal structure 2 may include the mechanical link mechanism 20 that converts the swinging of the accelerator pedal 10 into the sliding in the front-rear direction X of the traveling vehicle without using a wire. Because no wire is used, the operability of the accelerator pedal 10 can be improved.

In addition, the first rod 21L connected to the first swing member 211 and the second swing member 212, and the second rod 22L connected to the first swing member 221 and the second swing member 222, are subjected to stress corresponding to the reduced displacement in the width direction Y. By reducing the displacement in the width direction Y in the first link structure 21 and the second link structure 22, stress is dispersed in the first rod 21L and the second rod 22L. The load applied to one rod can be reduced, and deterioration in the operability of the accelerator pedal 10 due to deformation of the rod can be reduced or prevented.

Furthermore, even when stress corresponding to displacement in the width direction Y is applied to the first rod 21L and the second rod 22L, sliding of the first rod 21L and the second rod 22L is restricted by a rod fixing portion LF. Accordingly, because the first rod 21L and the second rod 22L do not slide irregularly with respect to the swing member, it is possible to reduce or prevent deterioration in the operability of the accelerator pedal 10 due to sliding of the first rod 21L and the second rod 22L.

In order to reduce the load applied to the second rod 22L, the second rod 22L may swing so as to be inclined in a front view of the traveling vehicle, as illustrated in FIG. 9. Accordingly, even when the sliding of the second rod 22L is restricted, the load applied to the second rod 22L can be reduced. Note that, because the opening 222h has the first sub-opening 222hs1 and the second sub-opening 222hs2, the second rod 22L may be smoothly inclined when the second rod 22L swings. As a result, the load applied to the second rod 22L may be further reduced.

Further, in the first link structure 21, the angle α of the swing shaft a with respect to the width direction Y is 15 degrees, and the angle β of the swing shaft b with respect to the width direction Y is about 10 degrees, for example. Therefore, the angle β is smaller than the angle α. In addition, in the second link structure 22, the angle β of the swing shaft b with respect to the width direction Y is about 10 degrees, and the angle γ of the swing shaft c with respect to the width direction Y is 0 degree, for example. The angle β is smaller than the angle γ. Thus, even if wire is not used, the displacement of the link member in the width direction Y can be reduced every time the displacement of the link member is transmitted by each link structure, and the swinging of the accelerator pedal 10 can be converted into sliding in the front-rear direction X.

Furthermore, the difference between the angle α and the angle β in the first link structure 21 is about 5 degrees, for example. In the second link structure 22, the difference between angle β and angle γ is about 10 degrees, for example. Therefore, the difference between the angle α and the angle β in the first link structure 21 is smaller than the difference between the angle β and the angle γ in the second link structure 22. As a result, in the first link structure 21 close to the accelerator pedal 10, the decrease in the displacement in the width direction Y is reduced while the decrease in the displacement in the width direction Y is increased in the second link structure 22 spaced apart from the accelerator pedal 10, and hence the swinging of the accelerator pedal 10 can be converted into the sliding in the front-rear direction X without reducing the operability.

The length of the second rod 22L is longer than the length of the first rod 21L. In the second link structure 22, in order to increase the reduction in displacement in the width direction Y, the stress applied to the second rod 22L of the second link structure 22 is larger than the stress applied to the first rod 21L of the first link structure 21. By increasing the length of the second rod 22L to which a large stress is applied, the strain applied per unit length due to the stress can be reduced, and deterioration in the operability of the accelerator pedal due to the deformation of the second rod 22L can be reduced or prevented.

Further, the fixing pin 221P is inserted into the insertion hole 221I such that the second rod 22L is removable from the first swing member 221. Accordingly, by removing the fixing pin 221P from the insertion hole 221I, the second rod 22L can be removed from the first swing member 221, thus enabling maintainability to be improved. In addition, because the sliding of the first end 22L1 is restricted by the protrusion 221C, the sliding of the first end 22L1 can be easily restricted in comparison with a case where the sliding of the first end 22L1 is restricted by the two fixing pins 221P by inserting the two fixing pins. As a result, the second rod 22L can be easily attached to the first swing member 221, and maintainability can be improved.

Other Preferred Embodiments

Although the present invention has been described in detail with reference to the preferred embodiments described above, it will be apparent to those skilled in the art that the present invention is not limited to the preferred embodiments described herein. The present invention may be practiced as modifications and variations without departing from the spirit and scope of the present invention as defined by the claims. Accordingly, the description herein is intended to be illustrative and has no restrictive meaning with respect to the present invention.

In the above-described preferred embodiments, each of the first end 22L1 and the second end 22L2 of the second rod 22L is restricted from sliding along the entering-exiting direction ED, but the present invention is not limited to this configuration. Not only the second end 21L2, but also the first end 21L1, of the first rod 21L may be restricted from sliding along the entering-exiting direction ED. Moreover, when the bilateral fixing portions FB are provided only to one end of the first rod 21L, the bilateral fixing portions FB may be provided not on the first swing member 211 on the accelerator pedal 10 side, as in the above-described preferred embodiments, but instead on the second end 21L2 side inserted into the opening 212h provided in the second swing member 212. As a result, because the first end 21L1 close to the accelerator pedal 10 slides, the load applied to the first rod 21L can be reduced.

In the above preferred embodiments, the displacement in the width direction Y is reduced by two link structures (the first link structure 21 and the second link structure 22), but the present invention is not limited to this configuration. The displacement in the width direction Y may be reduced by three or more link structures. In the above preferred embodiments, the accelerator pedal 10 is described as an example of a pedal that suppresses deterioration in the operability, but the present invention is not limited thereto. The pedal may be a brake pedal or a clutch pedal.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle pedal structure comprising:
  a pedal swingable about a swing shaft inclined with respect to a width direction of a traveling vehicle in a top view of the traveling vehicle;
  a mechanical link to convert swinging of the pedal into sliding in a front-rear direction of the traveling vehicle; wherein
  the mechanical link includes a plurality of link structures that include a pair of swings and a rod connected to the pair of swings;
  the pair of swings includes:
  a first swing to swing about a first swing shaft in accordance with the swinging of the pedal; and
  a second swing to swing about a second swing shaft in accordance with the swinging of the first swing, the swinging being transmitted via the rod;
  the rod includes:
  a first end inserted into an opening in the first swing; and
  a second end inserted into an opening in the second swing;
  each of the first end and the second end of the rod is restricted from sliding along an entering-exiting direction in which the first end and the second end are each inserted into the openings and removed from the openings; and
  in the plurality of link structures, in the top view, a second angle of the second swing shaft with respect to the width direction is smaller than a first angle of the first swing shaft with respect to the width direction.

2. The vehicle pedal structure according to claim 1, wherein
  the link structure includes a first link structure and a second link structure to which the swinging of the pedal is transmitted via the first link structure;
  the first link structure is closer to the pedal than the second link structure;
  at least in the second link structure, each of the first end and the second end is restricted from sliding along the entering-exiting direction; and
  a difference between the first angle and the second angle in the first link structure is smaller than a difference between the first angle and the second angle in the second link structure.

3. The vehicle pedal structure according to claim 2, wherein a length of the rod of the second link structure is longer than the length of the rod of the first link structure.

4. The vehicle pedal structure claim 1, further comprising:
  a fixing pin to fix the first end;
  an insertion hole, into which the fixing pin is inserted, in the first end; and
  a protrusion that protrudes from the first end in a direction perpendicular or substantially perpendicular to the entering-exiting direction; wherein
  in the entering-exiting direction, the first swing is between the fixing pin and the protrusion, so that sliding of the first end is restricted; and the fixing pin is inserted into the insertion hole such that the rod is removable from the first swing.

\* \* \* \* \*